Dec. 30, 1924.

C. M. RUDDUCK

CORN HARVESTER

Filed April 18, 1922    2 Sheets-Sheet 1

1,520,723

Inventor
Clarence M. Rudduck
By Staley W Bowman
Attorneys

Dec. 30, 1924.
C. M. RUDDUCK
1,520,723
CORN HARVESTER
Filed April 18, 1922   2 Sheets-Sheet 2
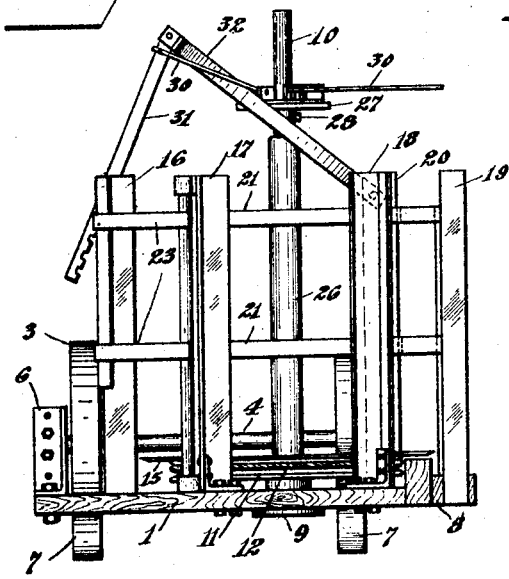
Inventor
Clarence M. Rudduck
By Staley Bowman
Attorneys Patented Dec. 30, 1924.

1,520,723

UNITED STATES PATENT OFFICE.

CLARENCE M. RUDDUCK, OF SPRINGFIELD, OHIO.

CORN HARVESTER.

Application filed April 18, 1922. Serial No. 555,089.

*To all whom it may concern:*

Be it known that I, CLARENCE M. RUDDUCK, a citizen of the United States, residing at Springfield, in the county of Clark and State of Ohio, have invented certain new and useful Improvements in Corn Harvesters, of which the following is a specification.

My invention relates to improvements in machines for harvesting Indian corn or similar crops.

An object of the invention is to provide in a machine of this character a revolving cutting device which will also act to convey the severed stalks to a suitable point of discharge.

A further object is to provide, in connection with this cutting device and conveyor, cooperating gathering arms to assist in conveying the severed stalks to the point of discharge, together with means for disengaging said arms from the stalks after the stalks have been conveyed to the proper point.

A further object of the invention is to devise a machine of this character which will be simple in construction, economical in manufacture and effective in operation.

In the accompanying drawings:

Fig. 3 is a rear end view.

Fig. 4 is a vertical section on the line 4—4 of Fig. 1.

Fig. 5 is a detail in perspective of a portion of one of the conveyor arms and its support.

Figure 1:
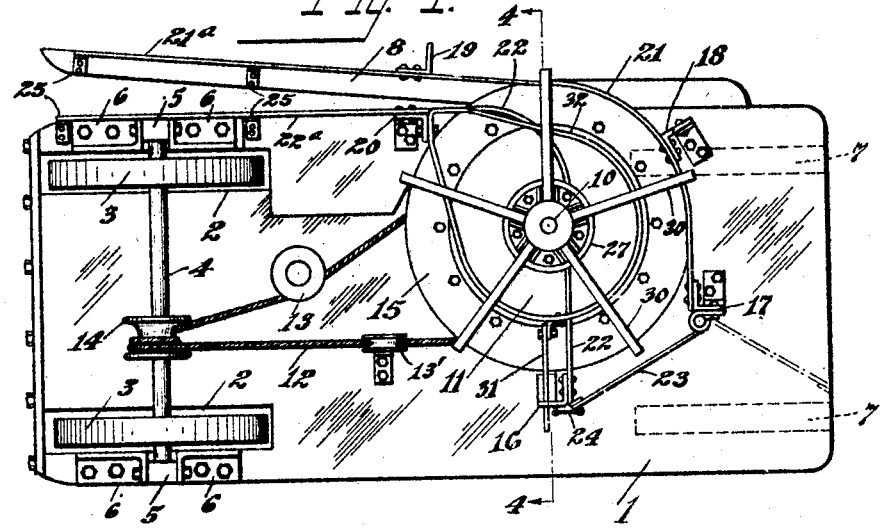
Fig. 1 is a top plan view of a machine embodying the improvement.
Figure 2:
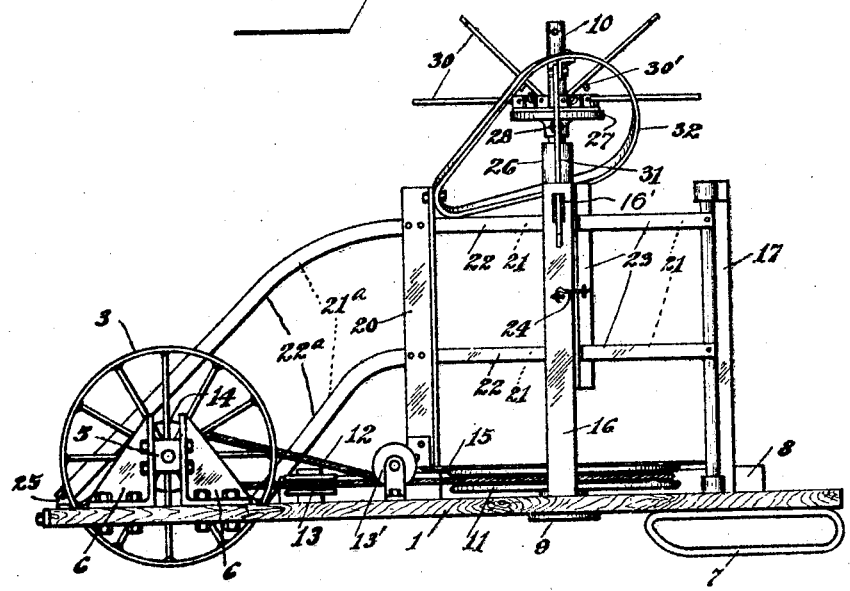
Fig. 2 is a side elevation.

Referring to the drawings, 1 represents a wooden platform having its forward end formed with slots 2 to accommodate a pair of carrying wheels 3, the axle 4 of which is journaled in bearings 5 carried by the brackets 6, secured to the upper side of the platform; these bearings being adjustably secured to the brackets so that the wheels 3 may act as gage wheels to regulate the height of cut. The rear end of the platform is supported on a pair of runners 7.

Secured to one side of the platform and diverging forwardly therefrom is a member 8, which, together with the forward end of the platform, forms a rearwardly converging throat to receive the stalks of corn or other growth. Mounted in a bearing 9 carried by the platform is a vertical shaft 10, and secured adjacent the lower end of this shaft is a disk 11, the periphery of which is grooved to receive a cable 12, which passes over idlers 13 and 13' and about a sheave 14 fast to the axle 4. Secured to the upper surface of the disk 11 at the outer edge thereof and projecting beyond the edge is a circular cutting blade 15, which sweeps across the inner end of the throat as the disk is revolved by the forward movement of the machine and severs the stalks which enter the throat.

Arranged on the platform and on the throat member 8 is a series of vertical angle-iron supports 16, 17, 18, 19 and 20 and secured to these supports are flat strips 21 and 22. The supports and strips are so arranged as to form a passageway from the supports 19 and 20 in the direction of travel of the rotating disk, this passageway diverging and terminating in a hinged gate 23 which is hinged to the post 17 and may be fastened to the post 16 by a catch 24. The strips are also extended forwardly as indicated at 21$^a$ and 22$^a$ and are fastened to small brackets 25 located respectively on the throat member 8 and platform so as to guide the stalks as they pass into the throat.

The shaft 10 is journaled in a sleeve 26 which is secured in any suitable way to the strips 22, this sleeve serving to support the shaft in a vertical position. The upper end of the shaft has secured thereto a head 27 by a bolt 28, the bolt being arranged to pass through any one of a series of openings 29 in the shaft so that the head may be supported at different heights. Pivotally mounted upon this head are arms 30, four of such arms being shown in the present case equally spaced about head, the pivots for the arms being such as to permit the arms to swing upwardly, each arm having a small leg 30' which rests upon the head 27 to normally maintain the arm in a horizontal position. Secured to the post 20 and also to an adjustable arm 31 fastened to the post 16 is a cam-shaped track 32 lying in the path of movement of the arms 30, the high point of this track being so disposed as to raise the arms near the rear end of the passageway formed by the strips 21 and 22. The arm 31 has a series of notches 31' to engage the lower edge of an opening 16' in the support 16 and thus enable the height of the arm to be adjusted to correspond with the adjustment of the head 27 and thus provide for adjusting the height of the arms 30 and track 32 to adapt them to different heights of stalks.

The operation of the machine is as follows: The machine is drawn forwardly so as to cause a row of corn stalks or other growth to enter the throat. The stalks are severed by the knife 15 and the severed stalks then carried by the rotating disk and the arms 30 and packed against the gate 23 from whence they may be removed by unlatching the gate.

Having thus described my invention, I claim:

1. In a machine of the character described, a supporting frame, a vertical shaft supported by said frame, a disk having a circular cutter on its periphery secured to said shaft together with means for rotating said disk, a head carried at the upper end of said shaft, means for attaching said head to said shaft at different points so that said head may be adjusted as to height with relation to said disk, a series of arms pivoted to said head, said arms cooperating with said disk to convey the severed stalks to a point of discharge, an inclined track upon which said arms ride arranged to lift the arms from the stalks near the point of discharge, and means for adjusting the height of said track.

2. In a machine of the character described, a platform, a member secured to one side of said platform and extending forwardly at an angle thereto to form a rearwardly converged throat, a disk mounted on said platform, together with means for rotating the same, a circular knife carried by said disk and arranged to sweep across the rear end of said throat, guides forming a passageway in the general direction of the rotation of said disk, an axially arranged vertical shaft carried by said disk and revolving therewith, arms pivotally connected with said shaft above said disk and cooperating with said disk to convey the severed stalks through said passageway, and an inclined track upon which said arms ride to raise the arms from said stalks near the end of said passage.

In testimony whereof, I have hereunto set my hand this 15th day of April, 1922.

CLARENCE M. RUDDUCK.